June 28, 1966 M. G. LEONARD ETAL 3,258,523
ELECTRICAL BUSHING ASSEMBLY
Filed Sept. 30, 1964 3 Sheets-Sheet 1

INVENTORS
Merrill G. Leonard and
Leonard L. Wright
BY
Donald R. Lackey
ATTORNEY

June 28, 1966　　M. G. LEONARD ETAL　　3,258,523
ELECTRICAL BUSHING ASSEMBLY

Filed Sept. 30, 1964　　　　　　　　　　　　　　3 Sheets-Sheet 2

3,258,523
ELECTRICAL BUSHING ASSEMBLY
Merrill G. Leonard, Brookfield, Ohio, and Leonard L. Wright, Sharon, Pa., assignors to Westinghouse Electric Corporation, East Pittsburgh, Pa., a corporation of Pennsylvania
Filed Sept. 30, 1964, Ser. No. 400,469
4 Claims. (Cl. 174—145)

This invention relates in general to electrical inductive apparatus, and more particularly to bushing assemblies for electrical inductive apparatus.

The high voltage bushing assembly utilized with electrical inductive apparatus, such as electrical distribution transformers, provides the necessary electrical insulation and creepage path for allowing a high voltage lead to enter an opening in the transformer casing, and it provides a seal around the opening to prevent moisture and other contaminants from entering. Another important function of the high voltage bushing assembly is to clamp the high voltage lead from the source potential in clamping means, which may be readily actuated to either clamp or unclamp the lead when desired. When a lightning arrester is utilized with the transformer, the clamping means should also form one terminal of a spark gap, with the other terminal being spaced a predetermined distance from the clamping means and electrically connected to the lightning arrester. The clamping means should be firmly secured to the electrical bushing, and the bushing should electrically insulate the clamping means from ground and also protect it from the weather.

Accordingly, it is an object of this invention to provide a new and improved bushing assembly for electrical inductive apparatus.

Another object of the invention is to provide a new and improved bushing assembly for electrical inductive apparatus that allows an electrical lead to be readily clamped or unclamped, and provides a spark gap terminal for use with a lightning arrester.

A further object of the invention is to provide a new and improved bushing assembly for electrical apparatus which has a clamping assembly disposed within an opening in the bushing and fastened to a projecting portion of the bushing within the opening.

Still another object of the invention is to provide a new and improved bushing assembly for electrical inductive apparatus that has a lead clamping assembly that may be fastened to a projection on the bushing by magnetic forming.

Another object of the invention is to provide a new and improved lead clamping assembly that may be fastened to a projection disposed within an opening in an electrical insulating bushing by magnetic forming, with a spin-free knob being utilized to actuate the clamp when desired and also to close the opening in the bushing.

Briefly, the present invention accomplishes the above cited objects by providing an electrical bushing having a central longitudinal opening therethrough for receiving an electrical lead. The lead opening terminates at one end of the bushing in a raised projection or boss, with the external portion of the bushing continuing for a predetermined distance to provide a walled opening around the boss. Clamping means comprising a collar for receiving an electrical lead and a screw driven shoe, are disposed on one side of a cap-like electrically conductive member which is shaped to substantially conform to the contour of the projecting boss, having an outer flanged portion which is substantially perpendicular to its central flat portion. The clamping means is fastened to the side of the cap member opposite the perpendicular flanged portion of the cap, and a conducting rod or member is fastened to the opposite side of the cap in electrical continuity with the clamping means. This assembly of clamping means, cap member, and conducting rod is disposed within the opening in the bushing, with the conducting rod entering the longitudinal lead opening in the bushing, and the flanged portion of the cap member surrounding the projecting boss. The flanged portion of the cap member is swaged, using magnetic forces, into firm contact or engagement with the boss, firmly securing the assembly to the bushing. The screw driven clamping shoe is connected through a threaded member to a spin-free knob, which allows the threaded member to be manually actuated to operate the clamping means, and also serves to cover the opening provided by the walled opening in the bushing. The collar portion of the clamping means also serves as one terminal of a spark gap. The collar has a projecting portion which is aligned with a transverse opening in the bushing wall which surrounds the clamping means. An arcing finger or conductor from a lightning arrester is disposed to enter the opening a predetermined distance and form the other terminal of the spark gap. When the spark finger or projection on the collar is aligned with the arcing finger from the lightning arrester, the collar will be aligned with another transverse opening or openings in the bushing wall for receiving an external electrical lead.

Further objects and advantages of the invention will become apparent as the following description proceeds and features of novelty which characterize the invention will be pointed out in particularity in the claims annexed to and forming a part of this specification.

For a better understanding of the invention, reference may be had to the accomapnying drawings, in which.

Figure 1:
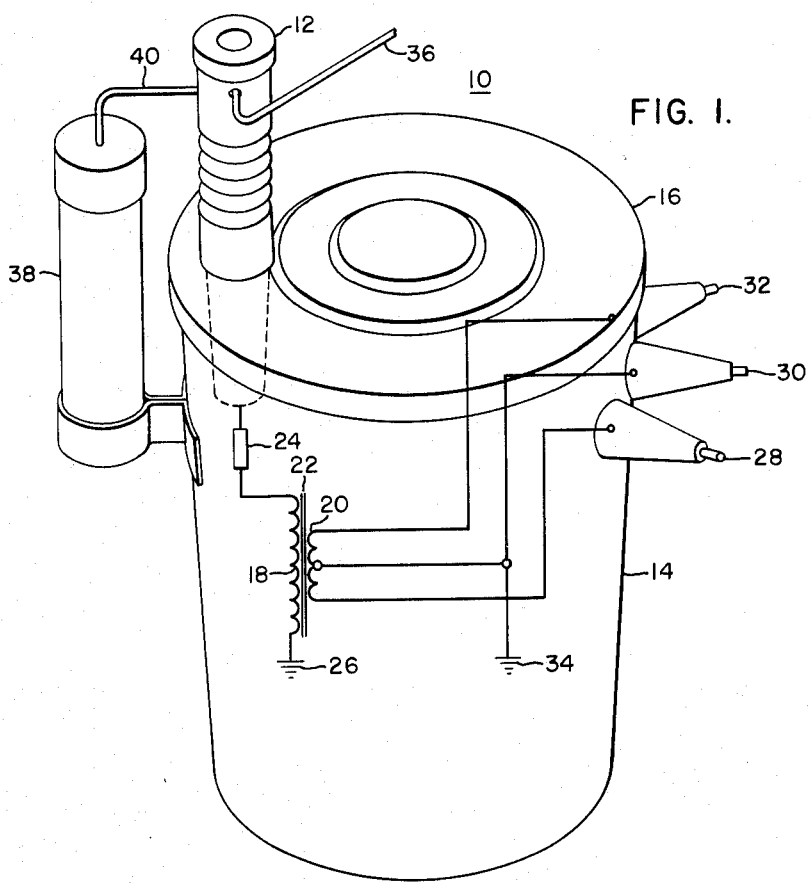
FIGURE 1 is a perspective, partially schematic, view of a transformer having a high voltage bushing which may utilize the teachings of this invention.

Referring now to the drawings, and FIG. 1 in particular, there is shown a perspective view of inductive apparatus, more specifically a transformer 10, having a high voltage electrical bushing assembly 12 which may be constructed according to the teachings of this invention.

The transformer 10 includes a high voltage winding 18 and a low voltage winding 20 disposed in inductive relation with a magnetic core 22. The windings 18 and 20 and magnetic core 22 are shown schematically, as their specific construction is not part of this invention. The windings 18 and 20, and magnetic core 22, are disposed within a casing or enclosure 14, which includes a cover 16. The enclosure 14 may be constructed of a conductor of electricity, such as steel, and contain a cooling dielectric, such as oil.

The high voltage winding 18 is connected to the high voltage bushing assembly 12 through protective link or fuse 24. Depending upon the application, the high voltage winding 18 may be grounded at 26, as shown, or the winding may be connected to still another high voltage bushing.

The low voltage winding 20 is connected to low voltage bushings 28, 30 and 32, with winding 20 being grounded at 34, in some applications.

The primary electrical service or source potential enters the transformer 10 from external electrical conductor 36 through electrical bushing assembly 12, with external conductor 36 being clamped within the bushing 12 in a manner which will be hereinafter described.

If transformer 10 is to be utilized where it will be subject to lightning surges, a lightning arrester 38 may be mechanically connected to the casing 14, and have a lead 40 disposed in spaced or gapped relation with the clamping means, with the gap distance being determined to allow an arc to be drawn at a certain voltage. If the casing 14 is grounded, the lighting arrester 38 may be connected to ground through its mechanical connection with the casing.

Although the transformer 10 is illustrated having the high voltage bushing assembly 12 cover mounted, and the low voltage bushing assemblies 28, 30 and 32 side wall mounted, it will be understood that the invention will be applicable regardless of the location of the bushings.

Figure 3:
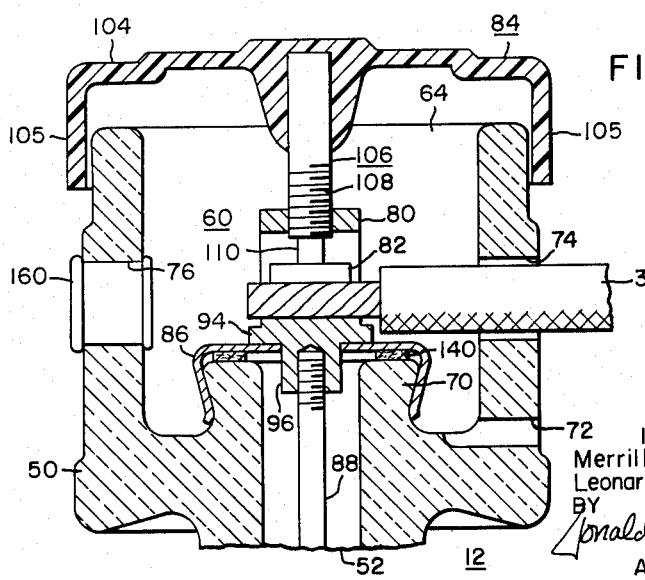
FIG. 3 is a side elevational view, partially in section, of the bushing assembly shown in FIG. 2.
Figure 2:
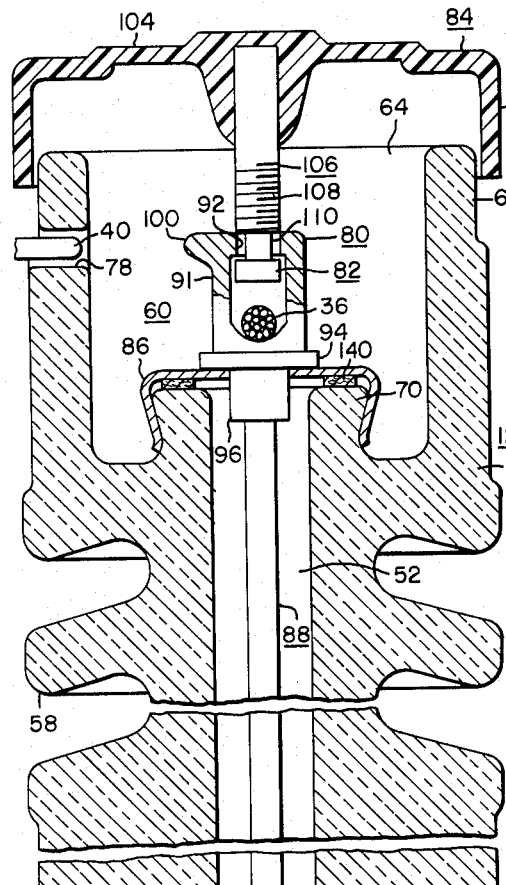
FIG. 2 is a front elevational view, partially in section, of a bushing assembly constructed according to the teachings of this invention.
Figure 2:
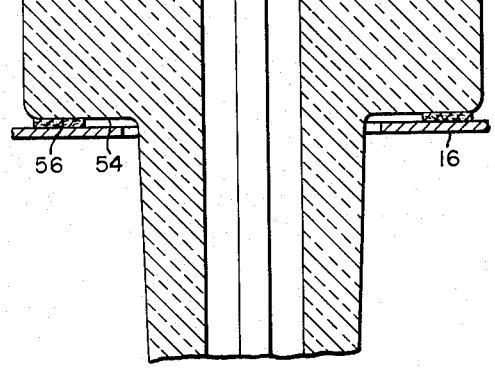
Figure 2:
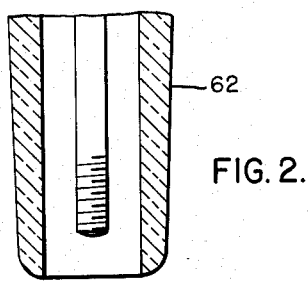

FIGS. 2 and 3 are front and side elevations, respectively, of high voltage bushing assembly 12, with some portions of the assembly being shown in section to facilitate the illustration of the various cooperating members.

In general, high voltage bushing assembly 12 includes a bushing member 50, clamping means 60, actuating means 84, mounting means 86, and electrical conductor 88. Bushing member 50 has a generally cylindrical, elongated, longitudinal construction, with side wall portions which define a longitudinal opening 52 which extends therethrough for receiving an electrical conductor. A seating portion 54 is disposed intermediate its ends for mounting the bushing member 50 in sealed relation with the casing of the electrical inductive apparatus, in this instance the cover 16. A gasket 56 formed of an elastic material, such as neoprene, may be disposed between the seating portion 54 and cover 16 to insure a moisture-proof seal.

Bushing member 50, which is constructed of an electrical insulator, such as porcelain, may have the conventional flanged portions 58 for providing the creep distance required for the voltage it is to withstand.

Longitudinal opening 52, defined by the wall portions of the bushing, extends completely through bushing member 50, with the wall portion being thinner adjacent one end to form a first opening connected with a second opening of smaller diameter. The smaller diameter opening continues through bushing member 50 to its lower end 62, which is the end that extends into the casing 14. The larger opening at the other end of bushing member 50 forms a chamber 64 surrounded by side wall portions 66. The side wall portions 66 define a cylindrical chamber 64 connected to the smaller diameter opening at its extreme end.

Disposed at the bottom portion of cylindrical chamber 64 is a projection or boss 70 which rises from the bottom portion of the chamber 64 to form a substantially cylindrical projection around the start of longitudinal opening 52.

Bushing member 50 also has transverse openings 72, 74, 76 and 78 disposed through side wall portion 66, whose functions will be hereinafter described.

Figure 4:
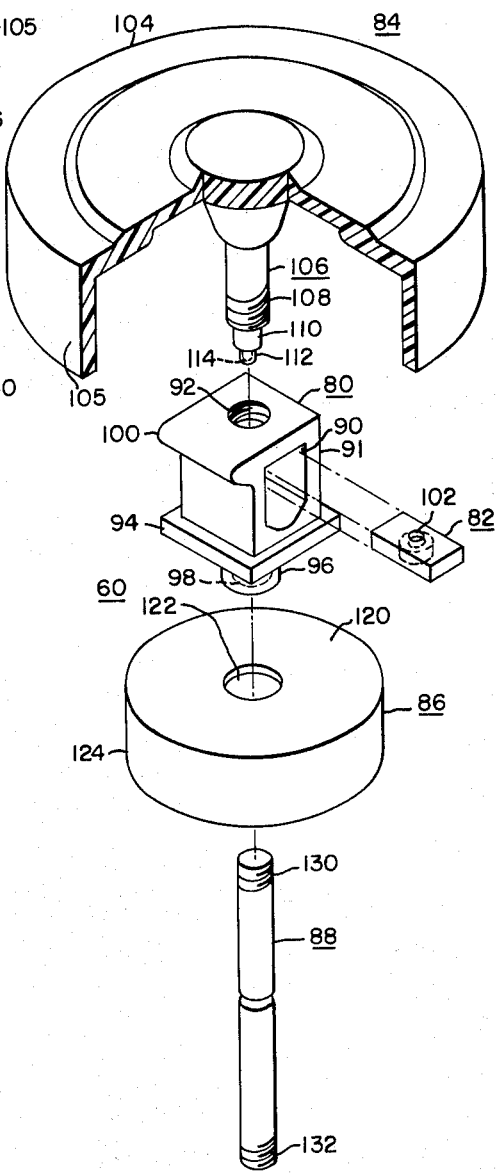
FIG. 4 is an exploded perspective view of the clamping assembly.

Clamping means 60, actuating means 84, mounting means 86, and electrical conductor 88 are shown in assembled relation in FIGS. 2 and 3, and in an exploded perspective view in FIG. 4. In general, clamping means 60 includes a collar member 80 and a shoe member 82 for physically clamping external electrical lead 36. Actuating means 84 includes a rod member 106 for actuating shoe member 82 and a knob 104 for physically covering the opening at the extreme end of chamber 64. Mounting means 86 is an electrically conductive cap member 86, which holds the complete clamping assembly 60 in assembled relation and fixes the assembly to bushing member 50. Conductive member or rod 88 is connected to clamping means 60.

More specifically, collar 80 has a substantially square or rectangular body portion 91 through which an opening 90, for receiving an electrical lead, extends from one side of the body portion to the other. The top of the body portion 91 has a threaded opening 92 which extends into the opening 90. Collar 80 has a flanged base portion 94 for mounting against a flat surface, with a cylindrical projecting member 96 extending from the bottom surface of base portion 94. Cylindrical projecting member 96 has a threaded opening 98 disposed therein for receiving the conducting rod 88. The upper portion of collar 80 has a projecting portion 100 which is aligned to face the lead 40 from lightning arrester 38, and thus form a spark gap which will break down and carry an electrical arc when the voltage from lead 40 to projection 100 reaches a predetermined magnitude. Since collar 80 must carry electrical current, it may be formed of tin plated silicon bronze, which provides high strength and corrosion resistance as well as good electrical conductivity, or it may be formed of any other suitable electrical conductor. Collar 80 may be cast to shape, or it may be extruded if desired, with the cylindrical depending member 96 being connected to the collar 80 in a subsequent operation, such as by brazing, if the collar 80 is extruded.

Shoe member 82 is disposed within the opening 90 formed in collar 80, and, together with collar 80, serves to clamp the electrical lead 36. Shoe member 82 is generally rectangular, with an opening 102 extending from its upper to its lower faces. The opening 102 has two different diameters, with the smaller diameter being disposed at the top portion of the shoe. The purpose of the two diameters will be explained hereinafter.

Actuating means 84 includes a knob portion 104 and a depending rod member 106. Rod member 106 includes three different portions, a threaded portion 108, which has the largest diameter, an unthreaded portion 110 adjacent the threaded portion and having a slightly smaller diameter than the threaded portion, and another unthreaded portion 112 at its extreme end having still a smaller diameter. The unthreaded portion 112 has a small opening 114 therein which allows it to be rolled over to secure the shoe 82, as will be hereinafter explained.

More specifically, rod member 106 is disposed to enter the opening 92 in the top of collar 80, with the threaded portion 108 of rod member 106 being threadably engaged with the internal threads of opening 92. Unthreaded portion 112 of rod member 106 is sized to enter the smaller diameter of opening 102 in shoe member 82. The wall in unthreaded portion 112 formed by the opening 114 is then "rolled" over into the larger diameter of opening 102 in shoe member 82, to secure shoe member 82 in opening 90 of collar 80. This not only secures shoe member 82 in the proper position, but also secures means 84 and prevents means 84 from being withdrawn from opening 92. When the threads of opening 92 and threaded portion 108 of rod member 106 are completely disengaged, unthreaded or smooth portion 110 will then be disposed in opening 90, and means 84 may be freely turned or spun without damage to the parts and without becoming free of collar 80.

The knob portion 104 thus is used to manually actuate shoe member 82 up and down within the opening 90 in collar 80, and is used to clamp and unclamp electrical lead 36 between shoe member 82 and collar 80 when desired. With the "spin-free" arrangement, the knob 104 may be turned until the threads of the rod member 106 and collar 80 are completely disengaged, without the parts becoming disassembled. The knob portion 104 also serves as a cover to protect the high voltage parts within the chamber 64 from foreign bodies.

FIG. 2 illustrates shoe member 82 in its completely retracted position, and FIG. 3 illustrates the shoe member 82 turned down against electrical lead 36. It will be noted that in either position, knob 104 covers the opening 64 with its depending flanged portion 105. The knob 104 is constructed of an electrical insulating material, such as polyester glass, and the rod portion 106 may be constructed of any metallic conductor having sufficient strength to prevent the threads from stripping.

The electrically conductive cap member 86 has a flat, circular upper portion 120 which has a centrally located opening 122 therein for receiving the depending cylindrical member 96 of collar 80. The sides 124 of the cap 86 flare downwardly to form a uniform depending flanged portion 124. The cap 86 may be formed of thin conductive material, such as copper sheet having a thickness of .030 inch.

Conductive member 88 is a cylindrical metallic rod having threads on each of its ends, 130 and 132. The threads on end 130 are designed to threadably engage the internal threads in cylindrical depending member 96 on collar 80. The threads on end 132 are designed to cooperate with a protective link 24, which in turn is connected to the high voltage winding 18.

Figure 5:
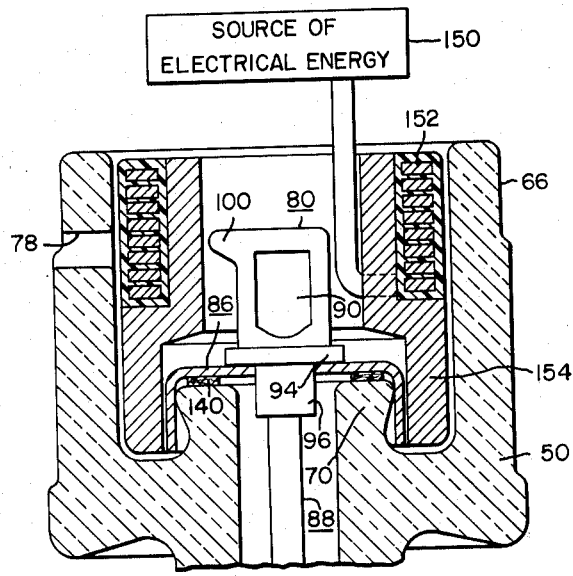
FIG. 5 is an elevational view, partially in section, showing how the clamping assembly may be electroswaged into firm engagement with the bushing.

In assembling the various components which comprise bushing assembly 12, the depending cylindrical portion 96 of collar 80 is inserted through the opening 122 of metallic cap 86, with the flanged portion 94 of collar 80 being disposed against the flat upper surface 120 of metallic cap 86. The collar 80 and metallic cap 86 are joined together, such as by brazing, and conductive member or rod 88 is then threadably engaged with depending portion 96 of collar 80. As shown in FIG. 5, this assembly is disposed within the chamber 64 formed by side wall portion 66 of bushing member 50, with the conductive rod 88 entering the longitudinal opening 52 and the flanged portion 124 of metallic cap 86 encircling the projecting boss 70 of bushing member 50. A gasket member 140 may be disposed between the projecting boss 70 and cap 86 to insure a fluid tight seal. Collar 80 should be aligned with its projecting portion 100 facing the opening 78 in side wall portion 66, which will then automatically align the opening 90 in collar 80 with the openings 74 and 76 in side wall portion 66. Opening 72 in bushing member 50 allows any moisture which enters chamber 64 to be drained.

The relatively close relationship of boss 70 with side wall portion 66 makes it difficult to mechanically form cap member 86 and obtain the firm uniform grip or engagement on boss 70 that is required. It is of the utmost importance that metallic cap 86 be firmly attached to boss 70, without danger of its turning, which would cause misalignment, and breaking of the hermetic seal between the cap 86 and boss 70.

FIG. 5 shows a solution to this problem. Instead of mechanically forming the flanged portion 124 of cap 86 by mechanical means, it may be magnetically formed. Magnetic forming requires a source of electrical energy 150, which is capable of supplying a large quantity of electrical energy over a very short period of time. For example, the source of electrical energy may be a bank of charged capacitors. The source of electrical energy is electrically connected to a solenoid coil 152, which is formed from a conductor of electricity into a plurality of turns having a predetermined diameter. A field shaper 154 constructed of a metallic conductor of electricity is disposed between the coil 152 and the metallic cap 86, which directs the magnetic field from the coil 152 into the flanged portion 124 of metallic cap 86. When the source of electrical energy 150 supplies electrical energy to the coil 152, an electrical field is created which produces a magnetic pressure on flanged portion 124 sufficient to swage or form the flanged portion into tight engagement with the boss 70. The very rapid uniform forming of cap 86 provides a permanently tight engagement between flanged portion 124 of cap 86 and boss 70, which provides a hermetic seal and prevents the cap from being turned relative to the boss 70. Magnetic forming of metals is described in greater detail in co-pending application Serial No. 332,538, filed December 23, 1964, by T. E. Franklin, now United States Patent 3,214,511, which is assigned to the same assignee as the present application.

After the collar-cap-conductor rod assembly is secured to the boss 70, the shoe 82 is inserted into the opening 90 in collar 80, with the shoe 82 being disposed in a holding jig or fixture (not shown) which has a small conical projection centered under the opening 102 in shoe member 82. Means 84, which includes knob 104 and rod member 106, is then disposed over the opening or chamber 64 in bushing member 50, with the rod member 106 threadably engaging the threads in opening 92 of collar 80. Knob 104 is turned to cause rod member 106 to advance further into the opening 92, until the unthreaded portion 112 extends into the opening 102 of shoe member 82 and the conical projection on the holding jig enters the opening 114 in unthreaded portion 112. By further turning knob 104 in the same direction, the conical projection on the holding jig forces the end of the unthreaded portion 112 outwardly into the larger diameter portion of opening 102 of shoe 82. This secures means 84 to the shoe 82. Knob 104 of means 84 may thus be turned until the threaded portion 108 is no longer engaged with the threaded opening 92, but it cannot be removed, thus maintaining shoe member 82 and means 84 in their proper assembled positions.

When bushing assembly 12 is disposed within an opening in electrical inductive apparatus as shown in FIG. 2, the electrical lead 40 from lightning arrester 38 is placed within opening 78 and arranged a predetermined distance from projecting portion 100 of collar 80 to form a spark gap, and electrical lead 36 is inserted through either transverse opening 74 or 76 in side wall portion 66. The unused opening may be capped with a suitable cap 160. The electrical lead 36 is then clamped firmly between shoe member 82 and collar 80, by simply turning the knob 104 to lower shoe member 82.

The arrangement disclosed herein has many advantages. The collar 80 performs the function of holding the electrical lead 36 and also forms one terminal of a spark gap when a lightning arrester is utilized. Means 84 serves as a knob for actuating the clamping and unclamping of the lead 36, and also provides a covering for chamber 64 to prevent foreign bodies from entering the chamber. Further, the knob 104 is spin-free, maintaining its assembled relationship and that of shoe member 82, regardless of how the knob is turned. The bushing member 50 provides an electrical insulated chamber for the clamping means 60, providing the necessary thickness of electrical insulation and the necessary distance to ground to prevent creepage, as well as mechanically protecting the clamping means 60 from foreign bodies and the weather. The cap 86 holds the clamping means 60 in assembled relationship, and also provides the function of securely holding the clamping means 60 in aligned relation with bushing member 50. The shape of cap member 86 and boss 70 allows the highly effective technique of magnetic forming to be used to secure the clamping means 60 to the bushing member 50.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A bushing assembly for electrically connecting an external electrical lead with electrical inductive apparatus comprising a bushing member having first and second ends and a wall portion which defines a longitudinal opening extending between its ends, said wall portion being thinner adjacent its first end, forming a first longitudinal opening having a predetermined diameter connected with a second longitudinal opening of smaller diameter, said bushing member having a projecting portion disposed within the first longitudinal opening which encircles the start of the second longitudinal opening, clamping means for receiving and clamping the external electrical lead, said clamping means being disposed within the first longitudinal opening of said bushing member, actuating means operably connected to said clamping means which substantially covers the opening at the first end of said bushing member, mounting means securing said clamping means to the projecting portion of said bushing member, said mounting means having a depending flanged portion which encircles the projecting portion of said bushing member and is in firm engagement therewith, and electrical conductor means connected to said clamping means and extending through at least a portion of the second longitudinal opening in said bushing member for electrical connection with inductive apparatus, said bushing member having at least one transverse opening through its wall portion disposed opposite said clamping means for allowing the external electrical lead to pass therethrough.

2. A bushing assembly for electrically connecting an external electrical lead with electrical inductive apparatus comprising a bushing member having first and second ends and a wall portion which defines a longitudinal opening extending between its ends, said wall portion being thinner adjacent its first end, forming a first longitudinal opening having a predetermined diameter connected with a second longitudinal opening of smaller diameter, said bushing member having a projecting portion disposed within the first longitudinal opening which encircles the start of the second longitudinal opening, clamping means having an opening for receiving and clamping said external electrical lead and a projecting portion which forms one terminal of a spark gap, said clamping means being disposed within the first longitudinal opening of said bushing member, actuating means for actuating said clamping means, said actuating means substantially covering the opening at the first end of said bushing member, mounting means securing said clamping and actuating means to the projecting portion of said bushing member, said mounting means having a depending flanged portion which encircles the projecting portion of said bushing member and is firmly secured thereto, and electrical conductor means connected to said clamping means and extending through at least a portion of the second longitudinal opening in said bushing member for electrical connection with said inductive apparatus, said bushing member having at least one transverse opening through its wall portion disposed opposite the opening in said clamping means for allowing the external electrical lead to pass therethrough, said bushing member having another transverse opening disposed opposite the projecting portion of said clamping means for allowing a second terminal of a spark gap to be disposed in gapped relation with the projecting portion of said clamping means.

3. An electrical bushing assembly for electrical inductive apparatus comprising a generally cylindrical, elongated bushing member having wall portions which define a first longitudinal opening at one end of said bushing member and a connecting second longitudinal opening of smaller diameter which proceeds to the opposite end of said bushing member, said bushing member having a projecting boss disposed within the first longitudinal opening in said bushing member which encircles the start of the second longitudinal opening, a metallic cap having a substantially flat circular portion and a depending flanged portion, said metallic cap having a centrally disposed opening therein, first means including a metallic collar having an opening extending therethrough for receiving an electrical lead and a shoe member disposed within the opening in said collar, said clamping means being secured to the flat circular portion of said metallic cap, said metallic cap and said clamping means disposed within said first longitudinal opening, actuating means for moving said shoe member relative to said collar and for substantially covering the end of said bushing member at the start of said first longitudinal opening, the depending flanged portion of said metallic cap encircling and firmly engaging the projecting boss, and electrical conductor means connected to said clamping means and extending through at least a portion of the second longitudinal opening in said bushing member for electrical connection with said inductive apparatus, said bushing member having at least one transverse opening through its wall portion disposed opposite the opening in said collar for allowing an electrical lead to pass therethrough.

4. An electrical bushing assembly for electrical inductive apparatus comprising a generally cylindrical, elongated bushing member having wall portions which define a first longitudinal opening at one end of said bushing member and a connecting second longitudinal opening of smaller diameter which proceeds to the opposite end of said bushing member, said bushing member having a projecting boss disposed within the first longitudinal opening in said bushing member which encircles the start of the second longitudinal opening, a metallic cap having a substantially flat circular portion and a depending flanged portion, said metallic cap having a centrally disposed opening therein, clamping means including a metallic collar having an opening extending therethrough for receiving an electrical lead, said metallic collar having a projecting portion which forms a terminal of a spark gap, a shoe member disposed within the opening in said collar, said metallic cap and said clamping means being disposed within said first longitudinal opening, actuating means for moving said shoe member relative to said collar and for substantially covering the end of said bushing member at the start of said first longitudinal opening, said clamping means being fixed to said metallic cap, the depending flanged portion of said metallic cap encircling and firmly engaging the projecting boss, and electrical conductor means connected to said clamping means and extending through at least a portion of the second longitudinal opening in said bushing member for electrical connection with the inductive apparatus, said bushing member having at least one transverse opening through its wall portion disposed opposite the opening in said collar for allowing an electrical lead to pass therethrough, said bushing member having another transverse opening through the wall portion disposed opposite the projecting portion of said collar to allow an electrical conductor to be disposed therein to form another spark gap terminal.

References Cited by the Examiner
UNITED STATES PATENTS

| | | | |
|---|---|---|---|
| 2,491,338 | 12/1949 | Smith. | |
| 2,740,100 | 3/1956 | Broverman. | |
| 2,883,640 | 4/1959 | Duenke | 339—202 |
| 2,934,593 | 4/1960 | Kollinger | 174—145 |
| 3,054,850 | 9/1962 | Dulude | 174—145 |

LARAMIE E. ASKIN, *Primary Examiner.*